US009736044B2

United States Patent
Lachapelle et al.

(10) Patent No.: US 9,736,044 B2
(45) Date of Patent: *Aug. 15, 2017

(54) ADAPTIVE CENTRALIZED COLLECTION OF PERFORMANCE MANAGEMENT DATA USING A METAMODEL

(71) Applicant: Accedian Networks Inc., St-Laurent (CA)

(72) Inventors: Luc Lachapelle, Blainville (CA); Michel Theoret, St-Eustache (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,830

(22) Filed: Oct. 15, 2015

(65) Prior Publication Data

US 2016/0036668 A1    Feb. 4, 2016

Related U.S. Application Data

(63) Continuation of application No. 13/570,326, filed on Aug. 9, 2012, now Pat. No. 9,191,286.

(51) Int. Cl.
*H04L 12/26* (2006.01)
*G06F 11/34* (2006.01)
*H04L 12/24* (2006.01)

(52) U.S. Cl.
CPC .......... *H04L 43/08* (2013.01); *G06F 11/3409* (2013.01); *G06F 11/3476* (2013.01); *G06F 11/3495* (2013.01); *H04L 41/145* (2013.01); *H04L 43/026* (2013.01); *H04L 41/0853* (2013.01); *H04L 43/0894* (2013.01)

(58) Field of Classification Search
CPC .................................................... G06F 11/3495
USPC ........................................................ 709/224
See application file for complete search history.

(56) References Cited

U.S. PATENT DOCUMENTS

| 6,367,037 B1 | 4/2002 | Remer |
| 7,020,697 B1 * | 3/2006 | Goodman .............. G06Q 10/10 709/223 |
| 7,561,521 B2 | 7/2009 | Meier |

(Continued)

OTHER PUBLICATIONS

Building Compilable Class Models, David S. Frankel, 2001 (28 pages).

(Continued)

*Primary Examiner* — David Lazaro
*Assistant Examiner* — Zia Khurshid
(74) *Attorney, Agent, or Firm* — Nixon Peabody LLP

(57) ABSTRACT

A method is provided for obtaining performance measurements via metamodels streamed from multiple types and models of network devices connected to a network. The method comprises installing a generic collection agent on a server connected to the network, retrieving the metamodels from the network devices by the collection agent, storing the metamodels in a collection of metamodels on the server to be accessed by the collection agent and the network devices, analyzing the metamodels to provide the network devices with addressing information, streaming the performance measurements from the network devices to the collection agent using the addressing information, and analyzing and storing the performance measurements for later use.

2 Claims, 5 Drawing Sheets

(56) References Cited

U.S. PATENT DOCUMENTS

| | | | |
|---|---|---|---|
| 8,379,538 B2 * | 2/2013 | Rolia | ................ G06F 11/3086 370/254 |
| 2007/0011299 A1 | 1/2007 | Farkas | |
| 2007/0266392 A1 | 11/2007 | Thoelke | |
| 2009/0178060 A1 | 7/2009 | Winter | |
| 2009/0327994 A1 | 12/2009 | Christensen | |
| 2010/0023626 A1 | 1/2010 | Hussain | |

OTHER PUBLICATIONS

Classworking toolkit: Combining source and bytecode generation, developerWorks, http://www.ibm.com/developerworks/java/library/j-cwt10045/index.html, Oct. 4, 2005 (9 pages).

Linux 2 6 22—Linux Kernel Newbies: http://kernelnewbies.org/Linux_2_6_22, Jul. 8, 2007 (15 pages).

Kernel Space—User Space Interfaces, Ariane Keller: http://people.ee.ethz.ch/~arkeller/linux/kernel_user_space_howto.html#s3, Jul. 2008 (21 pages).

* cited by examiner

One per Measurement Group 200 Member (201, 202) →

| | Field | Sample Values | Description |
|---|---|---|---|
| Measurement Beginning | | | |
| MeasurementDescriptors: | | | |
| | Name | "kpi1", | Used to indicate the beginning of the descriptions of the Measurement (201, 202) identified by the MetaModel Header 205 (See Figure 3). |
| 401 | DisplayName | "Packet Loss NE Valid", | The unique name assigned to the Measurement (201, 202). |
| | DisplayCategory | "Packet Loss" | The display string assigned to the Measurement (201, 202). |
| 402 | DisplayUnit | "BPS" | The category used in display of reports, CSV formatted reports and other potential report formats. |
| 403 | CountType | "INTEGER" | The unit of the Measurement (201, 202), for instance, BPS for bits per second or KBPS for Kilobits per second. |
| | AggregationType | "None" | Indicates the encoding of the Measurement (201, 202) when used internally by the Collection Agent 100. For instance: Integer, Long. |
| 404 | StreamOrder | "0" | Used to indicate a Measurement (201, 202) that is not a simple counter. Potential values include: Average, Sum, Minimum, Maximum, None |
| | StreamType | "INTEGER" | The relative sequence in the stream used by the Network Device (102, 105, 107) to report this group to the Collection Agent 100. |
| 405 | TableOrder | "6" | The encoding of the Measurement (201, 202) used by the Network Device (102, 105, 107). For instance: Integer, Long. |
| | | | The order to display the value used in printed or on-screen reports, CSV formatted reports and other potential report formats. |

Measurement Descriptor 203, 204

FIG. 4

ADAPTIVE CENTRALIZED COLLECTION OF PERFORMANCE MANAGEMENT DATA USING A METAMODEL

CROSS REFERENCE TO RELATED APPLICATIONS

This application is a continuation of and claims priority to U.S. application Ser. No. 13/570,326, filed Aug. 9, 2012, now allowed, which is hereby incorporated by reference herein in its entirety.

FIELD OF THE INVENTION

The present invention generally relates to Internet Protocol (IP) networks and associated methods and, more particularly, to techniques for collecting performance measurement data from devices with different capabilities and/or firmware versions.

BACKGROUND OF THE INVENTION

Transaction Language 1 (TL1) is a widely used management protocol and is a standard man-machine language to manage network elements. Simple Network Management Protocol (SNMP) is an Internet-standard protocol for managing devices on IP networks. It is used in network management systems to monitor network-attached devices for conditions that warrant administrative attention. SNMP polling is used to send SNMP requests to network devices to retrieve information. Network Management standards such as SNMP, TL1 and others are in use in many networks, but these standards do not provide the ability for network devices to dynamically stream new performance measurements to a collection agent. It is also desirable to allow the network device to stream different performance measurements at different intervals depending on the nature of the said measurements.

Given that a centralized collection agent may handle a very large number of networking devices, the networking traffic and the overall load needs to be minimized. This is an issue with SNMP and related standards.

Depending on the type of network device, performance metrics might be required to fully describe how the device will perform. This is particularly important when the device is under a high network load. Metrics that are expressed in terms such as Packets per Second (P/S), Connections per Second (C/S), Transactions per Second (T/S), and Maximum Concurrent Connections (MCC) provide information that can be vital to a more complete understanding of the device performance characteristics. For example, routers and switches are generally considered to be stateless devices because they forward each packet independently. Metrics such as T/S and P/S are sufficient to describe the performance of these devices. However, devices like firewalls, intrusion prevention systems, and load balancers, which create and maintain state tables to forward packets, require additional metrics, such as C/S and MCC, to fully and accurately describe their performance.

Current network management protocols and data collection techniques have some important limitations, particularly in the context of managing large Ethernet Services deployments, especially when Service Operation Administration and Management (SOAM) is used to monitor and enforce strict Service Level Assurance (SLA) performance guarantees. Any polling method where the collection agent explicitly attempts to retrieve the performance measurements from each network device in turn usually experiences significant scalability challenges. Furthermore, when deploying a potentially large number of networking devices that provide performance measurements, it may be difficult to ensure that all devices share the same version of firmware or report the same range (or set) of measurements. Finally, the encoding of the performance measurements may also differ among the various networking devices providing these measurements.

There is therefore a need to allow a network device to provide information about the set of measurements it can provide and the format of these measurements in an abstract way that can be understood by a centralized collection agent without the need to install a more recent version of the collection agent. The collection of the management and SOAM measurement data also needs to be optimized to eliminate the overhead associated with standards such as SNMP and TL1.

The abstracted definition should be able to support various data representations and be extensible. A MetaModel is a model that defines the components of a conceptual model, process, or system. A model is an abstraction of aspects in the real world; a MetaModel is another abstraction, highlighting properties of the model itself. MetaModeling is the construction of a collection of concepts (things, terms, etc.) within a certain domain.

Common uses for MetaModels are:
  As a schema for semantic data that needs to be exchanged or stored;
  As a language that supports a particular method or process;
  As a language to express additional semantics of existing information.

One of the techniques to implement MetaModels in this context is Byte Code Enhancement. In order to store instances of a class into data store, a class has to be persistence capable. There are different ways to make a class persistence capable. One of the ways is Byte Code Enhancement. When a Java class is compiled, a class file is generated. It contains the byte code. To make a class persistence capable, some extra code will be added to the source. In order to make the process transparent, byte code modification can be done. So this works even if you don't have the source code. The enhancement is a post compilation step and this approach is completely transparent to the Developer. Javassist (Java Programming Assistant) makes Java byte code manipulation simple. It is a class library for editing byte codes in Java; it enables Java programs to define a new class at runtime and to modify a class file when the Java Virtual Machine (JVM) loads it.

Metadata is defined as data providing information about one or more aspects of the data. Metadata is data about data; it is a collection of device specific unique data attributes.

MetaModels are collections of MetaData definitions. The key functional value that MetaModels offer is the capability to define unique sets of data definitions associated with model components.

SUMMARY OF THE INVENTION

In accordance with one embodiment, a method is provided for obtaining performance measurements via metamodels streamed from multiple types and models of network devices connected to a network. The method comprises installing a generic collection agent on a server connected to the network, retrieving the metamodels from the network devices by the collection agent, storing the metamodels in a collection of metamodels on the server to be accessed by the collection agent and the network devices, analyzing the metamodels to provide the network devices with addressing information, streaming the performance measurements from the network devices to the collection agent using the addressing information, and analyzing and storing the performance measurements for later use.

In one implementation, the collection agent detects the network devices, retrieves the metamodels upon detection of the network devices, analyzes the metamodels to obtain necessary addressing information, and sends the addressing information to the network devices, thereby allowing the network devices to stream the performance measurements to the collecting agent. The collection agent preferably recognizes a network device upon detection and analyzes only the most recent metamodel from that network device. If the collection agent has previously retrieved and stored the most recent metamodel, the collection agent may use the stored metamodel from the stored collection of metamodels. If the collection agent has not previously retrieved the most recent metamodel, the collection agent may retrieves and store the most recent metamodel in the collection of metamodels. The collection agent may use real-time parsing routines to create any missing or incomplete methods, objects, or tools necessary to handle the performance measurements according to instructions defined in the metamodels.

In a preferred implementation, each network device's metamodels include one or more management groups, each management group contains a set of measurements, and each management group is defined by a unique identifier. The measurements within each management group are defined by a set of attributes including a display name, a display unit, and a count type that defines the encoding of the measurement as one of an integer, a long integer, a double integer, and a null-terminated string. Each management group is preferably associated with a set of streaming intervals, and the collection agent activates streaming of a management group associated with a network device after analyzing that network device's metamodels.

BRIEF DESCRIPTION OF THE DRAWINGS

The invention may best be understood by reference to the following description taken in conjunction with the accompanying drawings.

FIG. 4 is a possible Descriptor of a Measurement.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
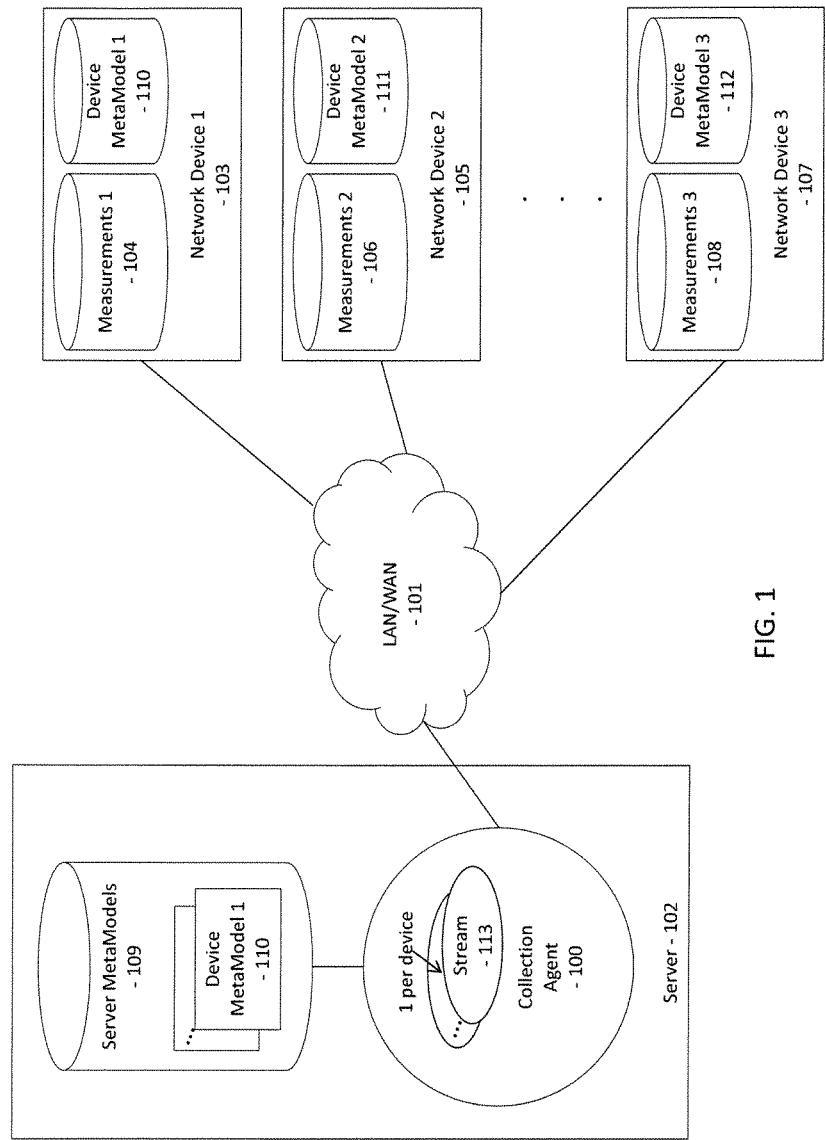
FIG. 1 is a network diagram of the components of the system.

FIG. 1 shows the various components of the system. Collection Agent 100 resides on Server 102 which is connected to a LAN/WAN 101 by standard means. There are various different types of Network Devices 103, 105 and 107 connected to the LAN/WAN 101 by standard means. These Network Devices 103, 105 and 107 contain Measurements 104, 106 and 108 and Device MetaModels 110, 111 and 112 describing the Measurements 104, 106 and 108 specific to the particular device in which the Collection Agent 100 is interested. These Measurements 104, 106 and 108 are grouped based on collection intervals (see FIG. 2). On startup or upon detection of new devices, the Collection Agent 100 retrieves the various Device MetaModels 110, 111 and 112 via file transfer (or similar methods) from each of the Network Devices 103, 105 and 107. These are stored as a collection of Server MetaModels 109 (accessible by Collection Agent 100) where each MetaModel defines the set of performance and other related Measurements 104, 106 and 108 that can be retrieved from a Network Device 103, 105 or 107. It is possible to use a generic Collection Agent 100 to receive and store the data. The software of the generic Collection Agent 100 can then handle multiple types or models of Network Devices 103, 105 and 107 as well as different firmware versions for these Network Devices.

In order to preserve a generic Collection Agent 100, it is important to be able to generate in real-time a set of parsing routines that can decode the attributes of each Measurement 104, 106 or 108) streamed from a Network Device 103, 105 or 107, even when a Network Device 103, 105 or 107 is introduced after the software version used by the Collection Agent 100 has been installed. To this end, it is important to be able to update the methods, objects and other tools used to manipulate the Measurements 104, 106 and 108 received from any Network Device 103, 105 or 107 and store them in an appropriate internal format using a collection of Server MetaModels 109 for later use.

A collection of Server MetaModels 109 is used to store a plurality of Device MetaModels 110, 111 and 112 that are defined to represent the set and the encoding of the Measurements 104, 106 and 108 that can be taken and reported by a Network Device 103, 105 or 107. Each MetaModel in the collection of Device MetaModels 110, 111 and 112 includes a generic Header (see FIG. 2) for each group of Measurements 104, 106 and 108.

Whenever a Network Device 103, 105 or 107 is known or detected by the Collection Agent 100, the Collection Agent 100 will retrieve the most recent Device MetaModel 110, 111 or 112 in use by the Network Device 103, 105 or 107. If this Device MetaModel 110, 111 or 112 is already known to the Collection Agent 100, it will use the relevant MetaModel stored in the collection of Server MetaModels 109 already available to Server 102 to simply associate the proper set of methods, objects or other tools required to translate and store the Measurements 104, 106 and 108 into an appropriate format for later use, for instance by an Element or Network Management platform. Otherwise, if the Device MetaModel 110, 111 or 112 in use by a Network Device 103, 105 or 107 is not yet known, then it is retrieved by the Collection Agent 100 from the Network Device 103, 105 or 107 and stored in the collection of Server MetaModels 109 and is then parsed and further analyzed in real-time to build or generate the necessary methods, objects or other tools to handle the Measurements 104, 106 and 108 represented by the Device MetaModel 110, 111 or 112. Any missing or incomplete methods, objects or other tools are dynamically created without the need for a newer version of the Collection Agent 100.

The "most recently used" Device MetaModel 110, 111 or 112 is saved in the collection of Server MetaModels 109 for each detected/known Network Device 103, 105 and 107 to potentially eliminate the need to parse the collection of Server MetaModels 109 and generate any missing code whenever the Network Device 103, 105 or 107 is detected again in the future.

Techniques such as Java Byte Code Enhancement and Insertion (using popular tools such as Javassist) are used in real-time to add support in the Collection Agent 100 for the new or redefined Measurements 104, 106 and 108 and other elements or attributes defined in the collection of Server MetaModels 109 and other necessary adjustments to the software of the Collection Agent 100.

Once the Device MetaModel 110, 111 or 112 is parsed and fully supported by the Collection Agent 100, the Collection Agent 100 will provide the Network Device 103, 105 or 107 with the necessary addressing information to allow the Network Device 103, 105 or 107 to stream the Measurements 104, 106 and 108 as defined by the particular Server MetaModel 109 to the Collection Agent 100. There is a Stream 113 set up per Network Device 103, 105 or 107.

The Collection Agent 100 may further assign a specific reporting period for the entire set of Measurements 104, 106 and 108 or for specific groups of Measurements 104, 106 and 108 in order to collect these measurements at the most relevant intervals.

The reporting interval for each Measurement 104, 106 or 108 is defined in the Device MetaModel 110, 111 or 112 and can be dynamically changed by the Collection Agent 100 if necessary. This is useful when the troubleshooting of specific Ethernet Virtual Circuits or other connections requires more granular reporting.

The stream activation or configuration command may be sent to the Network Device 103, 105 or 107 via a number of means, including but not limited to: Command Line Interface, Session Control protocol and other well known means.

The stream activation or configuration typically includes the following information:

Collection agent address: this is the layer 3 IP address of the Collection Agent 100 where the stream shall be sent.

Name of the group: this is the unique name assigned to the Group of Measurements 104, 106 and 108 that needs to be enabled or disabled. Alternatively, the unique StreamRecordId could be used to select the Group.

State: enabled or disabled.

Reporting period in seconds: specifies one of the supported reporting period defined for the Group identified.

Figure 2:
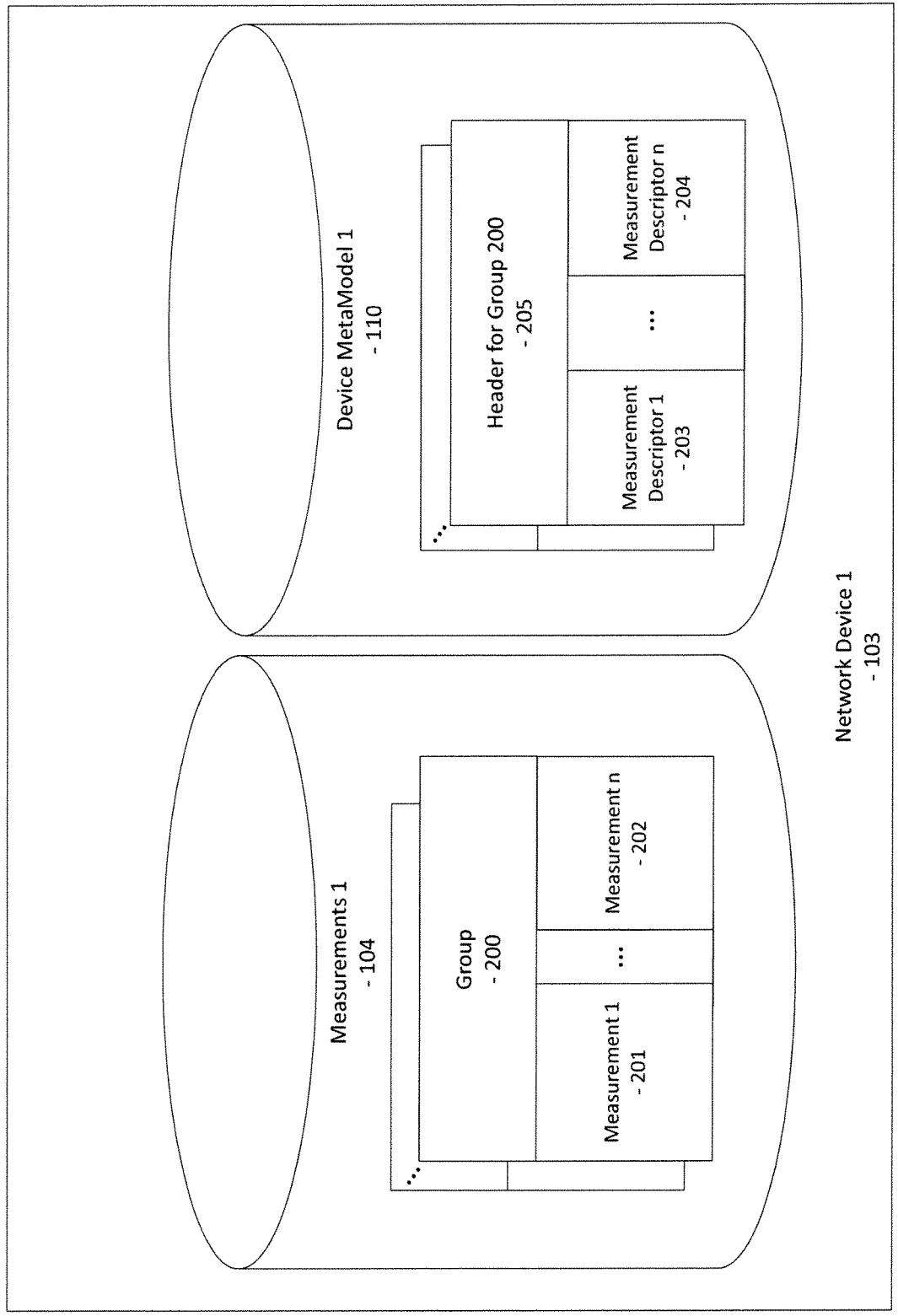
FIG. 2 is a breakdown of a Network Device Group of Measurements and corresponding MetaModel Header and Descriptors.

The above command or message may also be used to modify the reporting period of a specific Group (see FIG. 2).

Once the support for the Device MetaModel 110,111 or 112 of a Network Device 103, 105 or 107 is ready and the Stream 113 has been activated, the Collection Agent 100 will begin to receive the Stream 113 of measurements from the Network Device 103, 105 or 107, parse the collected data and store it internally for later use, for instance as part of an element or network management platform.

FIG. 2 shows a breakdown of a Network Device 103. The Measurements 104 are further broken up into Groups 200 that group together like Measurements 201 and 202. There can be one or more Groups 200 defined in the Network Device 103. There is a corresponding MetaModel 110 breakdown, which has a Header 205 for Group 200, as well as Measurement Descriptors (203, 204) for each of the Measurements 201 and 202 in the Group 200.

Figure 3:
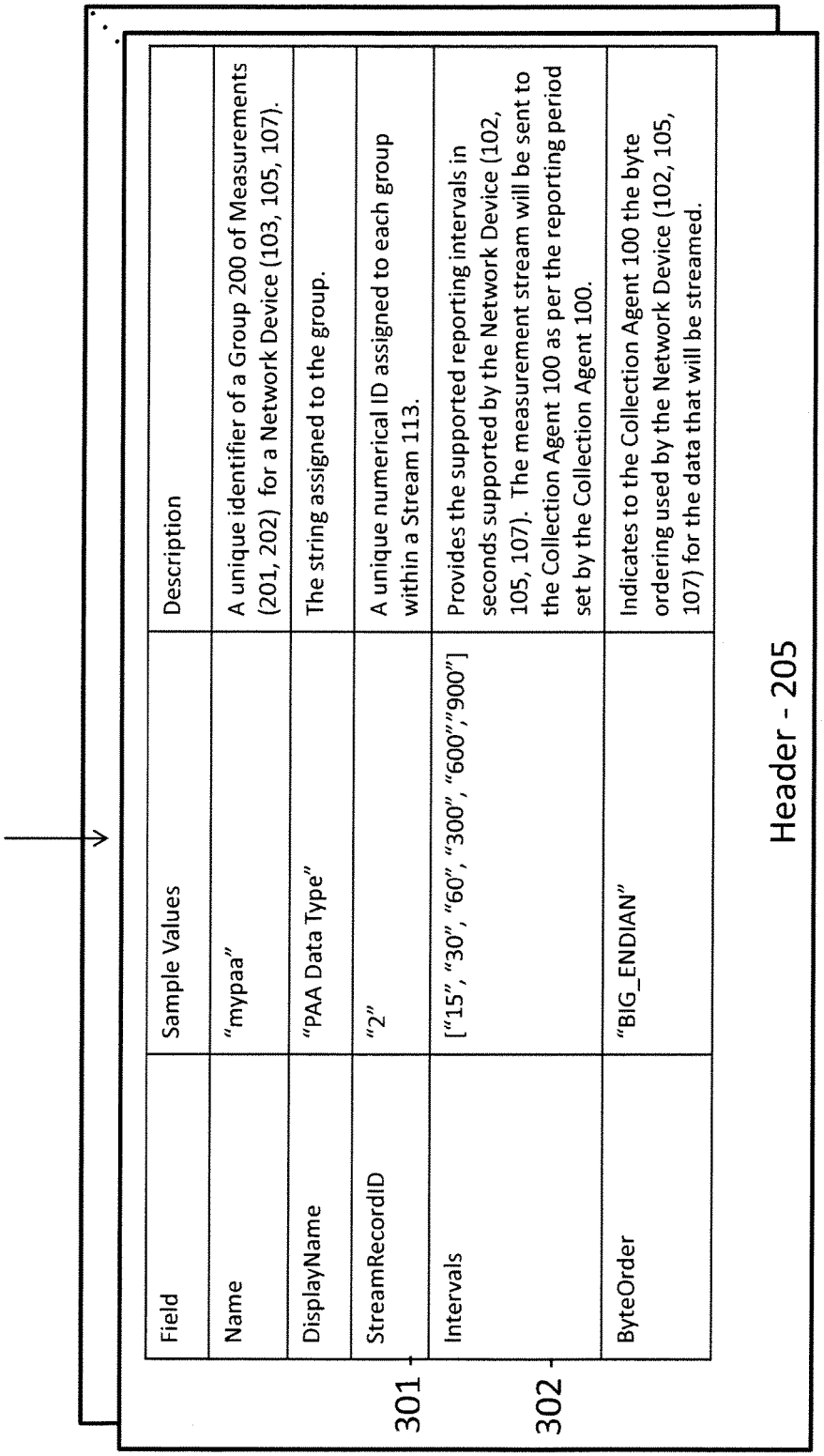
FIG. 3 is a possible Header for Device Group MetaModel.

FIG. 3 is a sample of a MetaModel Header 205 may look like. The Header 205 is repeated for each Network Device Measurement Group 200. In one implementation, the Network Device 103, 105 or 107 returns a Device MetaModel 110, 111 or 112 that incorporates multiple Group 200 definitions in a single file. In an alternate implementation, the Network Device 103, 105 or 107 uses distinct Device MetaModel (110, 111, 112) definitions, one per Group 200. Each group definition 200 is uniquely defined by its StreamRecordld 301. Each Group 200 further provides a set of supported Intervals 302 that is used for the streaming of the measurements associated to the Group 200. The Collection Agent 100 may select the proper streaming interval from the values defined in the Intervals 302 for each Group 200. The Collection Agent 100 may further modify the streaming interval by selecting another streaming interval from the set of values defined for the Group 200 by Intervals 302.

The Measurement Descriptor 203 or 204 then defines the attributes of each Measurement 201 or 202 supported by the Network Device 103, 105 or 107. FIG. 4 is a sample definition of this for network Device 103. In addition to the typical attributes associated to each Measurement Descriptor 203 and 204, such as DisplayName 401, DisplayUnit 402, and CountType 403, each Measurement Descriptor 203 and 204 specifies its relative position in the Stream 113 associated to a Group 200. The StreamOrder 404 is the index of the Measurement 201 or 202 in the Stream 113, starting at 0 with the next Measurement 201 or 202 in the Stream 113 having an index of 1 and so on, and the StreamType 405 indicates how the Measurement 201 or 202 will be encoded in the stream, for instance as an integer, a long integer, a double long integer or a null-terminated string.

Figure 5:
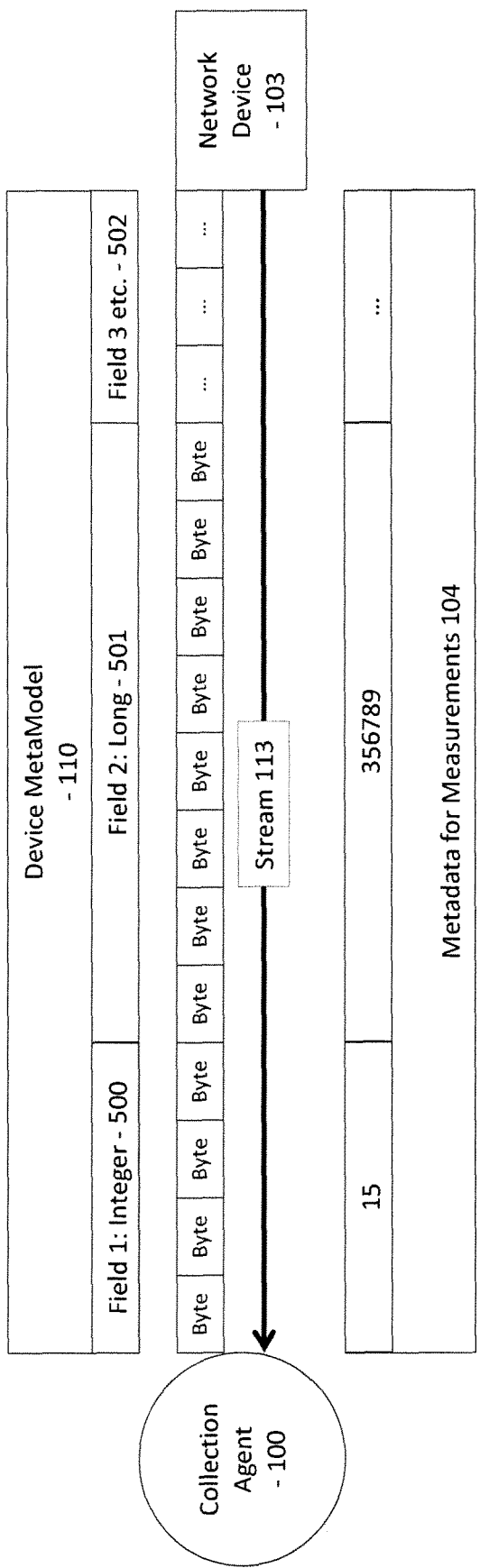
FIG. 5 is a depiction of the Collection Agent using the Device MetaModel to decode bytes of Metadata streamed from a Network Device.

FIG. 5 shows a Stream 113 of bytes going from the Network Device 103 to the Collection Agent 100. In order for the Collection Agent 100 to be able to interpret the bytes in stream 113, it must have a corresponding MetaModel 110. The example here shows that the first field in the MetaData for Measurements 104 is an integer 500, which is made up of 4 bytes of data from stream 113. The MetaData value for this field in this example is 15. The next field in the device MetaModel 110 is a long 501 which is made up of 8 bytes of data from stream 113. The MetaData value for this field is 356789. A different device stream would have a different MetaModel to interpret the data coming from the device. Any modifications to the MetaModel 110 may render the MetaData 104 useless unless the collection agent 100 retrieves an updated MetaModel 110 from the network device 103.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of obtaining performance measurements via metamodels and metadata streamed from multiple types, models, and firmware versions of network devices coupled to a network, said method comprising:

installing a generic collection agent on a server coupled to said network;

retrieving, by said generic collection agent, said metamodels from said network devices;

storing, by said server, said metamodels for access by said generic collection agent;

streaming said performance measurements as metadata from said network devices to said generic collection agent, said metadata defined by said metamodels; and analyzing, by said generic collection agent, said performance measurements using said stored metamodels, wherein real-time parsing routines are used to create any missing or incomplete methods, objects or tools necessary to handle said performance measurements according to instructions defined in said metamodels.

2. A system of obtaining performance measurements via metamodels and metadata streamed from multiple types, models, and firmware versions of network devices coupled to a network, said system comprising:

a generic collection agent installed on a server coupled to said network, said generic collection agent retrieving said metamodels from said network devices;

said server storing said metamodels for access by said generic collection agent;

said network devices streaming said performance measurements as metadata to said generic collection agent, said metadata defined by said metamodels; and said generic collection agent analyzing said performance measurements using said stored metamodels, wherein real-time parsing routines are used to create any missing or incomplete methods, objects or tools necessary to handle said performance measurements according to instructions defined in said metamodels.

* * * * *